Figure 1:
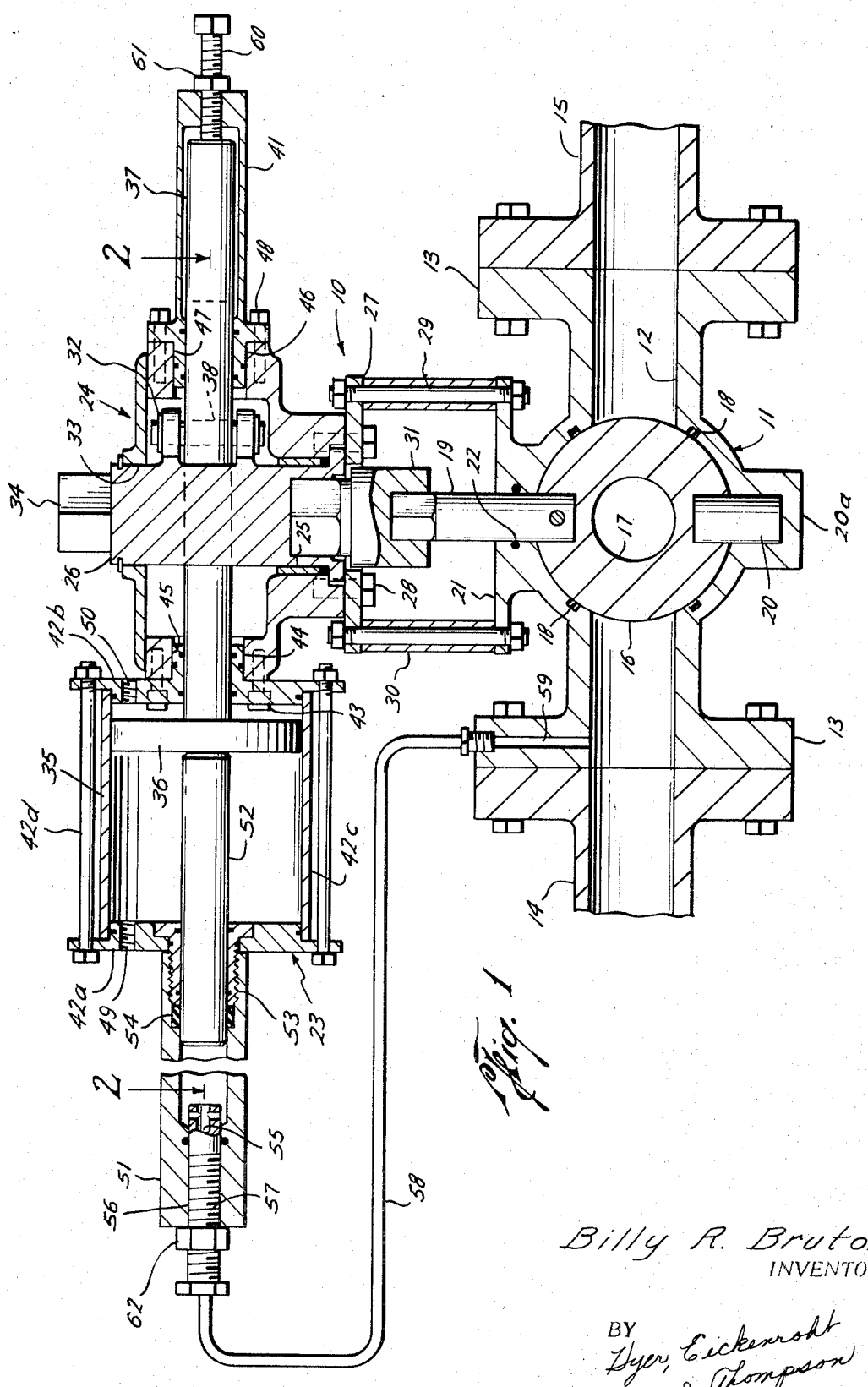

United States Patent
Bruton

[15] 3,650,506
[45] Mar. 21, 1972

[54] ROTARY VALVE WITH LINE PRESSURE CONNECTED ACTUATOR

[72] Inventor: Billy R. Bruton, Longview, Tex.
[73] Assignee: U.S. Industries, Inc., New York, N.Y.
[22] Filed: June 26, 1970
[21] Appl. No.: 50,236

[52] U.S. Cl. ............................251/26, 251/58, 251/63.4
[51] Int. Cl. ..............................................F16k 31/163
[58] Field of Search....................251/27, 58, 26, 63.4, 20, 31

[56] References Cited

UNITED STATES PATENTS

| | | | |
|---|---|---|---|
| 2,381,447 | 8/1945 | Hedene | 251/31 X |
| 1,051,768 | 1/1913 | Rumold | 251/58 X |
| 2,068,816 | 1/1937 | Pratt | 251/31 X |
| 3,570,804 | 3/1971 | Nelson | 251/63.4 X |
| 3,261,266 | 7/1965 | Ledeen et al. | 251/58 X |
| 3,452,961 | 7/1969 | Forsman | 251/58 X |

*Primary Examiner*—Arnold Rosenthal
*Attorney*—Hyer, Eickenroht, Thompson & Turner

[57] ABSTRACT

A rotary valve having a reciprocable, fluid-actuated operator which rotates the closure member to "fail" position by means of line pressure when there is a failure of power fluid normally used to operate the valve.

12 Claims, 3 Drawing Figures

Patented March 21, 1972

3,650,506

2 Sheets-Sheet 1

Billy R. Bruton
INVENTOR.

BY Dyer, Eickenroht
& Thompson
ATTORNEYS

Patented March 21, 1972

3,650,506

2 Sheets-Sheet 2

Billy R. Bruton
INVENTOR

BY Dyer, Eickenroht
& Thompson
ATTORNEYS

ROTARY VALVE WITH LINE PRESSURE CONNECTED ACTUATOR

This invention relates to improvements in "fail-safe" valves and operators therefor.

In a valve of this type, the closure member is caused to move automatically to either its opened or closed position in the event of failure of the power source for operating it. A particular need for such a valve may occur, for example, when the valve and its operator are located underwater or at some other remote location, wherein the valve may not be operated manually.

It has been proposed to initiate movement of a valve closure member to "fail" position by means of line pressure, thereby avoiding the necessity for other power sources, which in turn might require additional fluid lines subject to failure. However, to my knowledge, line pressure has been used for this purpose only in connection with gate valves, wherein such pressure acts over the cross-sectional area of the stem on the gate connecting it to the operator.

An object of this invention is to provide a rotary type valve in which the closure member is caused to move to "fail" position by means of line pressure; and, more particularly, to provide such a valve which is of simple and inexpensive construction.

Another object is to provide such a valve in which the fail-safe mechanism is incorporated into the operator, so that the operator may be used to provide existing valves with fail-safe ability.

A further object is to provide an operator in which the fail-safe mechanism is incorporated in such a manner as to require only a minimum of modification to conventional operator construction.

Still another object is to provide such an operator which serves the additional function of locating the closure member in its alternate positions, thereby avoiding the need for stops on the valve body often used for this purpose.

A still more particular object is to provide such an operator in which stops for locating the closure member in its alternate positions may be easily and quickly adjusted to compensate for misalignment, wear and the like.

These and other objects are accomplished, in accordance with the illustrated embodiment of the present invention, by a valve having an operator which, as in conventional operators for rotary valves, includes a reciprocable actuator connected to the closure member in the valve housing for rotating it between opened and closed positions. In the illustrated and preferred embodiment of the invention, the actuator comprises a fluid responsive, piston and cylinder type.

In accordance with the novel aspects of the present invention, the operator also includes an auxiliary cylinder on the main cylinder of the actuator, and an auxiliary piston sealably reciprocal within the auxiliary cylinder and extending into the main cylinder for engagement with the main piston. More particularly, a conduit fluidly connects the flowway within the valve housing with the auxiliary cylinder so that fluid within the flowway urges the auxiliary piston and thus the main piston in a direction to rotate the closure member to fail position upon failure of the fluid in the main cylinder.

In one embodiment of the invention, a rack carried on a rod on the piston which extends exteriorly of the main cylinder is in rotary driving engagement with a stem extending from the closure member in the valve housing. In another embodiment of the invention, a pin carried on the outer end of the rod is received within a slot in an arm which rotates with the stem so that the pin is free to slide in the slot as it rotates the arm in response to reciprocation of the rod.

In the preferred and illustrated embodiment of the invention, the operator is separate from the valve housing so that it may be installed on existing valves. For this purpose, the operator includes a frame having a bearing and adapted to be attached to the valve housing, and a stem extension rotatably mounted within the bearing for rotary driving connection with an outwardly extending portion of a stem on the closure member when the frame is attached to the housing.

Preferably, the operator includes stop means engageable with the rod and auxiliary piston so as to locate the stem extension in predetermined rotational positions. In this manner, the valve housing need not include parts for locating the closure member in its alternate positions, because the closure member is located by location of the stem extension.

Figure 2:
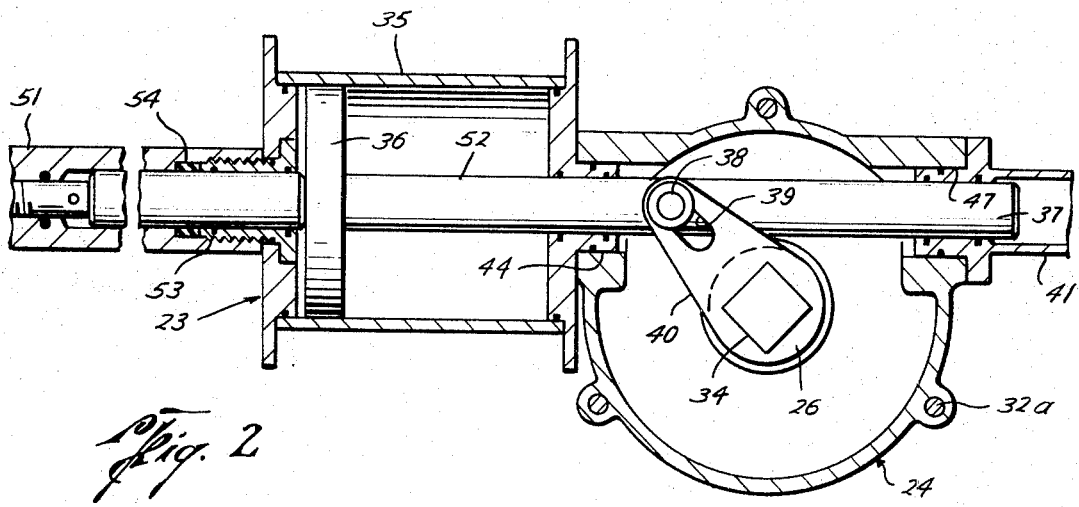
Figure 3:
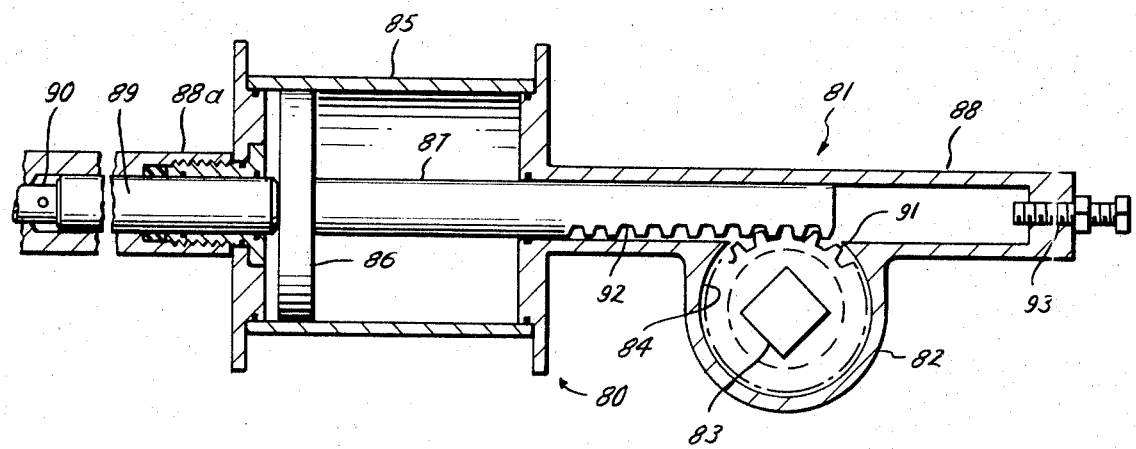

In the drawings, wherein like reference characters are used throughout to designate like parts:

FIG. 1 is a vertical sectional view of a valve and operator constructed in accordance with the first-mentioned embodiment of the present invention, and with the operator moved to a position closing the valve;

FIG. 2 is a horizontal sectional view of the operator of FIG. 1, as seen along broken line 2—2 of FIG. 1, and with the operator moved to a position opening the valve; and FIG. 3 is a horizontal sectional view of an operator for a valve constructed in accordance with the second-mentioned embodiment of the invention, and, as in the case of the operator of FIG. 2, moved to a position opening the valve.

With reference now to the details of the drawings, the valve embodiment which is shown in FIG. 1, and illustrated in its entirety by reference character 10, includes a housing 11 having a flowway therethrough and flanges 13 at each end bolted or otherwise secured to the adjacent ends 14 and 15 of a pipeline so as to align the flowway through the housing with the flowway through the pipeline. A ball-shaped closure member 16 is mounted within the housing for rotating between positions in which a port 17 through the closure member is disposed transversely of the flowway to close same, as shown in FIG. 1, and aligned with the flowway to open same. In this particular embodiment of the invention, the closure member rotates 90° between opened and closed positions, although it will be understood that the rotation of the closure member may involve most any angle up to 180°. Seal rings 18 are carried within the housing 11 for sealably engaging the closure member about the portions thereof disposed across flowway 12.

Stems 19 and 20 extend from the upper and lower ends, respectively, of the closure member. Lower stem 20 is journaled within a bearing 20a in the lower end of the housing, and the stem 19 is journaled within and extends through the upper flanged end 21, and a seal ring 22 is carried within the housing to surround the stem 19. The upper free end of the stem is thus in position for rotary driving connection with the valve operator described to follow.

This operator, which is designated in its entirety by reference character 23, includes a frame 24 having a bearing 25 at its lower end and a stem extension 26 rotatably mounted in and extending through the bearing. As shown in FIG. 1, the frame 24 is connected to the flanged upper side 21 of the valve housing so as to dispose the stem extension 26 in axial alignment with the stem 19 on the closure member 16. Thus, a flange 27 is secured by bolts 28 to the lower end of the frame 24 and a circle of bolts 29 connects the flange 27 to the flange about the upper end 21 of the valve housing. Spacer sleeves 30 around the bolts 29 fixedly space the operator frame from the valve housing.

A connector 31 is received between the lower end of stem extension 26 and the upper end of stem 19. As shown, this connector has a noncircular upper end fitting into a correspondingly shaped recess in the lower end of the stem extension 26, and a noncircular recess in its lower end fitting over a similarly shaped upper end of the stem 19. Upon attachment of the operator frame to the valve housing, the stem extension and stem are releasably connected together for driving engagement with one another.

As illustrated, the frame is cylindrical and has a removable cover 32 for its upper end which is attached to the main body of the frame by bolts 32a to form a lubricant chamber within the frame. The cover also provides a guide 33 for the upper end of the stem extension, while opposite sides of the frame support bearings for the reciprocating rod of the operator which is adapted to rotatably engage the stem extension within the lubricant chamber, as will be described hereinafter. The upper outer end 34 of the stem extension 26 is noncircular to permit it to be engaged by any suitable tool for manually rotating the stem extension in the event of failure of the fluid-actuated operating mechanism.

Operator 23 also includes a main cylinder 35 mounted on the side of the frame 24 and having a piston 36 sealably slidable therein. A rod 37 extends from the side of the piston 36 and through the right end of the cylinder 35 and the adjacent side of the frame 24 for rotary driving engagement with the stem 26 within the chamber 32. The rod extends as well through the opposite side of the frame, so as to be pressure balanced during reciprocation. A sleeve 41 projects from the frame to surround the rod and thus protect it from damage.

As shown in FIGS. 1 and 2, the rod extends at a right angle to the stem extension and carries a pin 38 for sliding within slots 39 in arms 40 rotatable with the stem extension so as to support and rotate the extension upon reciprocation of the rod. In the open position of the valve, the arms are disposed at about 45° to the left of a vertical line, and the pin 38 is at its outermost position with respect to the axis of the stem extension. In rotating the closure member 90, the arms will move from the position shown in FIG. 2 to a position at about 45° to the right of the vertical, during which the pin 38 will slide inwardly and then outwardly with respect to the slots 39, so that, in the open position of the valve, the pin will again assume an outermost position with respect to the axis of the stem extension. In this manner, the operator has good mechanical advantage during the initial and final stages of movement of the closure member.

Cylinder 35 includes heads 42a and 42b, respectively, at its opposite ends, and a cylindrical body 42c held tightly between and in sealed engagement with the heads by means of bolts 42d. The right-hand head 42b is secured to the left side of the frame 24 by bolts 43, and an extension 44 on the head fits closely within an opening 45 on the side of the frame to provide a bearing for the rod 37.

The sleeve 41 also has an extension 46 which fits closely within an opening 47 in the right side of the frame 24 to provide a bearing for the outermost end of the rod 37. The sleeve 41 is secured to the right side of the frame by means of bolts 48.

Ports 49 and 50 are provided in the cylinder heads 42a and 42b for alternately admitting pressure fluid to an exhausting it from the main cylinder on opposite sides of the piston 36 so as to cause the piston, and thus the rod 37, to move in opposite directions. A suitable power source and pilot valve for so actuating the piston 36 is not shown.

An auxiliary cylinder 51 is mounted on the head 42b on the left end of the main cylinder 35, and an auxiliary piston 52 sealably reciprocal within the cylinder 51 is elongated to extend into the cylinder 35 for engagement with the left side of the main piston 36. Thus, as will be described below, fluid pressure within the auxiliary cylinder 51 will act over the left-hand end of the auxiliary piston 52 to urge it to the right and thus urge the main piston 36 and the rod 37 thereon to the right for rotating the closure member 16 to the closed position of FIG. 1.

As shown in FIG. 1, a tubular extension 53 extends through a hole in the cylinder head 42a and into a counterbore in the right-hand end of auxiliary cylinder 51 to provide a bearing for the elongated end of the auxiliary piston 52. A packing 54 is held between the outer end of the extension and the inner end of the counterbore to provide a seal about the auxiliary piston 52. As shown, the elongated piston 52 is separate from main piston 36, so that a conventional operator may be easily and quickly adapted for use with the auxiliary cylinder and piston.

Fluid is introduced into the auxiliary cylinder 51 on the left-hand end of the auxiliary piston 52 through a port 55 extending through a rod 56 threadedly received within an opening 57 in the left end of the auxiliary cylinder 51. As shown in FIG. 1, this fluid is received from the flowway 12 and supplied to the auxiliary cylinder through a conduit 58 which is connected at one end to the outer end of the hollow rod 56 in fluid communication with the port 55 and at its other end with a passage 59 extending through the left-hand flange 13 in the housing 11 of the valve.

In the normal operation of the valve 10, the ball-shaped closure member 16 is rotated between opened and closed positions by the alternate introduction of power fluid to and exhaustion of power fluid from the ports 49 and 50, respectively, of the main cylinder 35. Thus, introduction of power fluid into the main cylinder on the left-hand side of the piston 36 will move the main piston and its rod 37 to the right so as to rotate the closure member to closed position. Alternatively, introduction of pressure fluid through the port 50 to the right-hand side of the main piston 36 will move the piston and its rod to the left, and thus move the closure member to open position.

However, and as previously described, upon failure of the power fluid for reciprocating the main piston 36, which may occur upon loss of pressure in the power fluid source, as by a break in one or more of the fluid lines, the valve is automatically moved to "fail-safe" position, which in this case is closed position (FIG. 1), by means of fluid pressure within the flowway 12 of the valve housing. Thus, during normal operation of the valve, the outside power source provides sufficient force to reciprocate the main piston 36 regardless of the force due to line pressure urging the auxiliary piston 52 into engagement with the main piston 36. However, upon failure of this power source, the force due to the line pressure acting on the left-hand end of the auxiliary piston 52 is sufficient to move the main piston 36 and thus the rod 37 to the right, which of course rotates the closure member 36 to the closed position of FIG. 1. Obviously, the arrangement may instead be such as to cause the closure member to be moved from closed to open position upon failure of the power system.

As previously mentioned, the closure member is located in its opened and closed position by stop means on the operator 23, whereby there is no need for stops in the housing 11 of the valve, as is normally the case. For this purpose, there is a screw 60 threadedly received in the right-hand end of the sleeve 41 enclosing the right-hand end of the rod 37 so as to engage the outer end of the rod 37 to locate the closure member 37 in the closed position of FIG. 1. In the event it is necessary to change the rotative location of the closure member, the screw may be backed off or moved in, as required. A lock nut 61 surrounds the screw so as to fix it in a desired axial position.

The rod 56 through which the port 55 extends provides a stop for engagement with the left-hand end of the auxiliary piston 52 to locate the closure member in its open position. It also may be backed in or out, as desired. A nut 62 is disposed about the outer threaded end of the rod 56 for fixing it in a desired axial position.

The embodiment of the valve illustrated in FIG. 3, and designated in its entirety by reference character 80, is identical to the valve 10 except with respect to certain features of the operator therefor, which is designated in its entirety by reference character 81. As in the case of operator 23, the operator 81 comprises a frame 82 which is cylindrical to provide a lubricant chamber 84 and has a bearing (not shown) in its lower end in which a stem extension 83 is journaled. Also, the frame 82 is adapted to be connected to the upper end of a valve housing and the lower end of the stem extension 83 is adapted for releasable driving connection with the upper end of the stem of the closure member rotatable within the housing, as in the case of the operator 23.

The operator 81 also includes a main cylinder 85 mounted on the left side of the frame 82 and having a main piston sealably reciprocal therein in responsse to fluid pressure supplied thereto and exhausted therefrom by suitable means. A rod 87 extends from the right side of the main piston 86 and through the right-hand end of the main cylinder 85 into the chamber 84 in the frame for rotary connection to the stem extension 83. The outermost end of the rod is received within a tubular extension 88 of the frame 82 when the rod moves to its rightmost position. In the position of the reciprocating actuator shown in FIG. 3, the closure member of the valve is in its open position, and, upon movement of the main piston 86 and thus the rod 87 to the right, the closure member is rotated to the closed position illustrated in FIG. 1.

An auxiliary cylinder 88a is mounted on the left side of the main cylinder 85 in a manner identical to that of auxiliary cylinder 51. Similarly, an auxiliary piston 89 is sealably reciprocal within the auxiliary cylinder 88a and is elongated to extend into the main cylinder 85 for engaging the left-hand end of the piston 86. As was also the case of the operator of FIGS. 1 and 2, the auxiliary piston 89 is urged to the right by means of fluid pressure admitted to the auxiliary cylinder 88a through a port within a rod 90 extending into the left end of the auxiliary cylinder.

As shown in FIG. 3, a gear 91 is mounted on the stem extension 83 for rotation therewith, and a rack 92 is provided on the right-hand of the rod 87 for rotary driving engagement with the gear 91, as will be apparent from FIG. 3. Preferably, and as illustrated in FIG. 3, the rack end of the rod 87 is closely received within tubular extensions on the left and right sides of the frame 82 for guiding therein.

As in the case of the operator 23, the operator 81 includes stops for engaging the rod 87 at its right-hand end and the auxiliary piston 89 at its left-hand end for locating the closure member in its alternate positions. Thus, as in the case of the operator 23, the rod 90 is axially adjustable within the left-hand end of the auxiliary cylinder 88a, and an axially adjustable screw 93 is mounted on the right-hand end of frame extension 88.

The function and operation of the auxiliary cylinder and piston are thus identical to that described in connection with the embodiment of FIGS. 1 and 2, such that it need not be repeated here.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A valve, comprising a housing having a flowway therethrough, a closure member rotatable within the housing between positions openings and closing the flowway, and an operator for so rotating the closure member including a reciprocable, fluid responsive actuator, means connecting the actuator to the closure member for rotating it between opened and closed positions, in response to reciprocation of the actuator, means for supplying fluid to the actuator from a source independent of fluid within the flowway for causing it to reciprocate, a cylinder, a piston sealably reciprocable within the cylinder and having means thereon engageable with the actuator, and a conduit fluidly connecting the housing flowway with the cylinder so that fluid within the flowway urges the piston and thus the actuator in a direction to rotate the closure member to one of its positions upon failure of the fluid supply.

2. A valve of the character defined in claim 1, wherein the means connecting the actuator to the closure member includes a rack reciprocable with the actuator, and a stem on the closure member having a gear engaged with the rack for rotation in response to reciprocation of the actuator.

3. A valve of the character defined in claim 1, wherein the means connecting the actuator to the closure member includes a pin reciprocable with the actuator, a stem on the closure member having an arm for rotation therewith, said arm having a slot in which the pin is slidable upon rotation of the arm so as to rotate the stem in response to reciprocation of the actuator.

4. A valve, comprising a housing having a flowway therethrough, a closure member rotatable within the housing between positions opening and closing the flowway, and an operator for so rotating the closure member including a main cylinder, a main piston sealably reciprocable within the main cylinder, means connecting the main piston to the closure member for rotating it between opened and closed positions, in response to reciprocation of the main piston, means for alternately introducing fluid to and exhausting fluid from the main cylinder on opposite sides of the main piston, an auxiliary cylinder, an auxiliary piston sealably reciprocable within the auxiliary cylinder and having means thereon extendible into the main cylinder for engagement with the main piston, and a conduit fluidly connecting the housing flowway with the auxiliary cylinder so that fluid within the flowway urges the auxiliary piston and thus the main piston in a direction to rotate the closure member to one of its positions upon failure of the fluid in the main cylinder.

5. A valve of the character defined in claim 4, wherein the means connecting the main piston to the closure member includes a rod having a rack thereon, and a stem on the closure member having a gear engaged with the rack for rotation in response to reciprocation of the rod.

6. A valve of the character defined in claim 4, wherein the means connecting the main piston to the closure member includes a rod having a pin thereon, and a stem on the closure member having an arm for rotation therewith, said arm having a slot in which the pin is slidable upon rotation of the arm so as to rotate the stem in response to reciprocation of the rod.

7. For use with a rotary type valve having a housing with a flowway therethrough, a closure member rotatable between positions opening and closing the flowway, and a stem on the closure member extending through the housing to the exterior thereof, an operator comprising a frame having a bearing and means for attachment to the valve housing, a stem extension rotatably mounted within the bearing for rotary driving connection with the stem on the closure member when the frame is attached to the housing, a main cylinder, a main piston reciprocable within the main cylinder and having a rod thereon extending from the main cylinder, means connecting the outer end of the rod to the stem extension for rotating the stem extension in response to reciprocation of the main piston, means for alternately introducing fluid to and exhausting fluid from the main cylinder on opposite sides of the main piston, an auxiliary cylinder on the main cylinder, an auxiliary piston sealably reciprocable within the auxiliary cylinder and having a rod thereon extendible into the main piston for engagement with the main piston, a port in the auxiliary cylinder through which fluid may be introduced for urging the auxiliary piston and thus the main piston in a direction to rotate the stem extension upon failure of the fluid in the main cylinder.

8. An operator of the character defined in claim 7 including stop means engageable with the rod and auxiliary piston to locate the stem extension in predetermined rotational positions.

9. An operator of the character defined in claim 8, wherein said stop means includes an axially adjustable screw mounted on each of the frame and auxiliary cylinder.

10. An operator of the character defined in claim 9, wherein the screw mounted on the auxiliary cylinder is hollow to provide the port therein.

11. An operator of the character defined in claim 7, wherein the means connecting the outer end of the rod to the stem extension includes a rack on the rod, and a gear on the extension engaged with the rack for rotation in response to reciprocation of the rod.

12. An operator of the character defined in claim 7, wherein the means connecting the outer end of the rod to the stem extension includes a pin on the rod, and an arm on the stem extension for rotation therewith, said arm having a slot in which the pin is slidable upon rotation of the arm so as to rotate the stem in response to reciprocation of the rod.

* * * * *